Patented Aug. 25, 1931

1,820,684

UNITED STATES PATENT OFFICE

JUSTIN F. WAIT, OF NEW YORK, N. Y., ASSIGNOR TO NATIONAL ANILINE & CHEMICAL CO., INC., A CORPORATION OF NEW YORK

PROCESS FOR INCREASING THE APPARENT DENSITY OF ORGANIC COMPOUNDS BEFORE FUSION WITH CAUSTIC ALKALI

No Drawing.  Application filed December 31, 1924. Serial No. 759,050.

This invention relates to a process of preparing materials so that they will be in such a condition that they will be better suited for subsequent treatment. It relates more particularly to the preparation of materials such as organic compounds, for example, which are often found either in a fluffy or power-like state. The apparent specific gravity of such materials is often quite small. (By apparent specific gravity is meant the weight per unit volume of the mass of subdivided material, as distinguished from the actual specific gravity, which is the weight per unit of volume of the solid material in the mass).

In the manufacture of a number of chemical products, a dry solid reacting ingredient is required to be mixed with a liquid ingredient at an elevated temperature. The liquid ingredient, in many cases, is a molten solid of comparatively higher specific gravity than the solid ingredient, and the solid ingredient is in the form of a fluffy powder whose apparent specific gravity is much lower than that of the liquid ingredient. Accordingly, when the solid is added to the agitated liquid, mixing does not readily take place and a considerable amount of it dusts, with the result that the solid tends to float upon the surface of the liquid and in the atmosphere above the liquid, where it is subjected to the prevailing elevated temperature conditions while out of reactive contact with the liquid. The subjection of the unreacted solid ingredient to the high temperatures frequently causes undesired side reactions and decomposition of the solid ingredient, resulting in a decrease in the yield and in the purity of the desired product. Often it also happens that air and/or moisture are contained in the interstices of the mass of solid material, tending also to cause undesired side-reactions, oxidation, and decomposition, particularly in the floating unreacted solid material.

Sometimes the solid material contains water of crystallization which may also be accompanied by other volatile substances, some of which have high boiling points and are therefore not removed in the original drying of the solid material. Removal of these components is quite essential in many instances in order to insure the production of a product of high quality.

As an illustration of a process subject to the above drawbacks, there may be cited the manufacture of an organic chemical product by the fusion of an organic chemical intermediate compound with molten caustic alkali, wherein the organic intermediate compound is added to an agitated fusion mass of the molten caustic alkali; and more specifically, the manufacture of indoxyl by the interaction of a salt of phenylglycine with a dehydrating agent, such as sodamide in a flux of molten caustic alkali. The salt of phenylglycine, prepared, for example, from aniline, formaldehyde and an alkali-metal cyanide, is a light fluffy powder, as ordinarily obtained from the drier, and normally contains water and an appreciable amount of aniline. The introduction of this light, powdery material into the comparatively heavy liquid caustic alkali melt containing sodamide and maintained at a temperature of about 250° C. is quite difficult because of the low apparent density of the material, and the evolution of the ammonia produced by the interaction of the sodamide present in the flux with the water present in the powder. As a consequence, a portion of the phenylglycine salt floats on the surface of the caustic alkali melt and in the atmosphere above it, and is subjected to the high temperature of the melt and/or the air and moisture contained in the mass of the salt while out of reactive contact with the dehydrating agent in the melt, which is probably why the yield and quality of the indigo derived from the fusion mass are lower than should be expected.

According to the present invention, the physical state of a powdery, fluffy solid material which is to be mixed with a liquid is so changed that mixing of the solid and liquid readily can be accomplished, even though the liquid has a specific gravity considerably higher than the apparent specific gravity of the solid.

By the present invention the solid material is made more dense either during the production of the material or subsequently by removal of the air or other gas that is present in the interstices, between the particles. This removal of the gas or air may, in certain instances, be done by compressing the mass, thus driving out a part of the air or gas.

The present invention also provides for the removal of air or other gas from the interstices between the particles of the mass of solid material and replacement thereof by an inert gas in those cases wherein their presence is undesirable. The air or gas may be displaced, for example, by passing the inert gas through the mass, or by partially evacuating the spaces between the particles of solid material and then introducing the neutral gas.

The present invention also includes a method of removing water of crystallization and other volatile substances, which may be high boiling, from the solid material. This involves heating the solid material to an abnormally high temperature for a limited amount of time. By limiting the time at which the material is subjected to the high temperatures, I have found it possible to prevent decomposition of the material itself and yet drive off moisture and less volatile impurities.

Where one liquid impurity as, for example, water occurs in appreciable quantities and is to be removed, I have found it desirable to add a second liquid which is preferably immiscible with the water so that upon heating, a mixture of vapors of both the water and the introduced liquid will be evolved and the water will be removed, but at a lower temperature than the normal boiling point thereof. This indirect method of removing one liquid by means of another immiscible liquid is applicable both to drying, distillation and other processes.

In treating sodium phenylglycinate which is in the form of a powder and which has been produced from aniline, formaldehyde and sodium cyanide, the sodium phenylglycinate is compressed in order to form a more dense material and to eliminate air from between the particles of the powder. By compressing the phenylgycine salt, the product is more certain to be completely mixed with the flux and to thus give the desired reaction and less of the side reactions. Losses resulting from dusting are likewise decreased or obviated. The presence of a binder to hold the particles together generally facilitates the handling and introduction of the product. A suitable binder for the phenylglycine salt seems to occur as a result of a side reaction during the production of the phenylglycine salt.

It has also been found desirable to protect the phenylglycine salt in an inert atmosphere such as ammonia gas as soon as the salt has been formed. Air is thus excluded and the salt is less apt to decompose upon being introduced into the heated region above the flux. The use of the ammonia in this case eliminates moisture and air which would otherwise fill the voids of the salt mass. Other objections due to light density might still exist and this part of the process may, when desired, be combined with the compression of the material to form a more dense product.

It has been found that if the phenylglycine, aniline and water mixture which results from the phenylglycine reaction is dried at temperatures above 140° C., that a more dense salt is obtained. This is more suited for introduction into the fusion mass than is the salt obtained by drying the mixture at lower temperatures. If temperatures of about 200° C. are used, a still more satisfactory density is obtained, the density obtainable by this method of operation being at least 20% greater than that obtainable by the normal method of drying. It appears that an increase in temperature of about 50° C. will often produce a more dense salt and one usually containing less water or other volatile component. With delicate products the heating period of 5 or 10 minutes, which is suitable in treating phenylglycine, might have to be shortened appreciably. It has also been found that if instead of drying phenylglycine salt under high vacuum as is usually done, an absolute pressure of from 5 to 13 pounds is used, the density of the salt will be still greater. It is necessary to limit the time to 5 to 10 minutes if the higher temperature is to be used, otherwise the phenylglycine salt itself is apt to become decomposed. By rapidly cooling the salt to below 140° C. at the end of this time interval, the tendency to decompose is minimized. By following out this procedure it is possible to produce a phenylglycine salt containing less than 0.3% water which is considerably below that ordinarily obtainable.

In preparing the liquid containing the phenylglycine salt for drying, it is preferable that the amount of aniline should exceed $\frac{1}{4}$ of the weight of water present. It is found that by so doing practically all of the water may be eliminated. Materials other than aniline are satisfactory as, for example, benzol or solvent naphtha. These materials also might be used for removing water from other products. It so happens that aniline is used as one of the ingredients of the reaction in preparing phenylglycine salt and is, therefore, convenient to use in carrying out the present process.

I claim:

1. The improvement in the process of preparing an organic compound by the fusion with caustic alkali of an intermediate organic compound in the form of a powder, which comprises compressing the powder to remove gas from the interstices between particles thereof, thereby increasing the apparent density of said powder, and mixing the compressed powder with molten caustic alkali.

2. The improvement in the process of producing indoxyl which comprises removing air from the interstices between particles of a finely subdivided phenylglycine salt, and mixing the resulting salt with a flux containing molten caustic alkali.

3. The improvement in the process of producing indoxyl which comprises increasing the apparent density of an alkali-metal salt of phenylglycine in the form of a loose powder, and mixing the powder with a flux containing molten caustic alkali.

4. The improvement in the process of producing indoxyl which comprises compressing an alkali-metal salt of phenylglycine in the form of a loose powder to increase the apparent density of said powder, and mixing the compressed salt with molten caustic alkali and sodamide.

5. The process which comprises removing moisture and aniline from an alkali-metal salt of phenylglycine in the form of a dry powder by heating it at a temperature above 140° C. for less than 10 minutes.

6. The improvement in the process of producing indoxyl which comprises removing moisture and aniline from an alkali-metal salt of phenylglycine in the form of a dry powder by heating it at a temperature above 140° C. for less than 10 minutes, compressing said powder to increase its apparent density, and mixing the compressed salt with a flux containing molten caustic alkali.

7. The process which comprises preparing an alkali-metal salt of phenylglycine in the form of powder containing water, and aniline in an amount greater than one-fourth of the weight of the water, and heating the powder to remove water and aniline.

8. The process which comprises drying a mixture containing a phenylglycine salt, aniline and water in which the aniline is more than one-fourth of the weight of the water by heating to drive off water and aniline and then increasing the temperature above 140° C. for a sufficiently long time to reduce the water content below 0.3% of the dried product.

9. The process of densifying a phenylglycine salt containing water and aniline which comprises subjecting it to a pressure between 5 and 13 pounds absolute pressure and heating the same to a temperature above 140° C.

10. In a process of producing indigo involving the fusion of a phenylglycine salt in a caustic melt, the steps which comprise replacing air in the interstices between particles of finely subdivided phenylglycine salt by ammonia, and introducing said phenylglycine salt into a caustic melt.

In testimony whereof I affix my signature.

JUSTIN F. WAIT.